United States Statutory Invention Registration [19]

[11] Reg. Number: H457

Walker, Jr. et al. [43] Published: Apr. 5, 1988

[54] CATHODE FOR USE IN HIGH ENERGY PRIMARY THIONYL CHLORIDE CELL SYSTEMS AND HIGH ENERGY PRIMARY THIONYL CHLORIDE CELL SYSTEMS INCLUDING THE CATHODE

[75] Inventors: Charles W. Walker, Jr.; William L. Wade, Jr., both of Neptune, N.J.; Michael Binder, Brooklyn, N.Y.; Sol Gilman, Rumson, N.J.

[73] Assignee: The United States of America as represented by the Secretary of the Army, Washington, D.C.

[21] Appl. No.: 768,271

[22] Filed: Aug. 22, 1985

[51] Int. Cl.[4] ..... H01M 10/36

[52] U.S. Cl. ..... 429/101; 429/196

[58] Field of Search ..... 429/101, 196, 42

[56] References Cited

U.S. PATENT DOCUMENTS

| | | | |
|---|---|---|---|
| Re. 30,661 | 6/1981 | Eisenberg | 429/196 |
| 4;121,020 | 10/1978 | Epstein et al. | 429/196 |
| 4,367,268 | 1/1983 | Behl | 429/101 |
| 4,410,608 | 10/1983 | Goebel et al. | 429/101 |
| 4,447,505 | 5/1984 | Blanchart | 429/42 |
| 4,461,814 | 7/1984 | Klinedinst | 429/101 |
| 4,474,863 | 10/1984 | Behl | 429/101 |

FOREIGN PATENT DOCUMENTS

| | | | |
|---|---|---|---|
| 0118657 | 9/1984 | European Pat. Off. | 429/101 |

*Primary Examiner*—John F. Terapane
*Assistant Examiner*—Susan Wolffe
*Attorney, Agent, or Firm*—Sheldon Kanars; Jeremiah G. Murray; Roy E. Gordon

[57] ABSTRACT

A cathode is provided for use in high energy primary lithium-thionyl chloride cell systems or calcium-thionyl chloride cell systems. The cathode comprises an expanded metallic current collector screen into which has been pasted a mixture of a low surface area conductive carbon black and a high surface area conductive carbon black previously mixed with a binder.

5 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

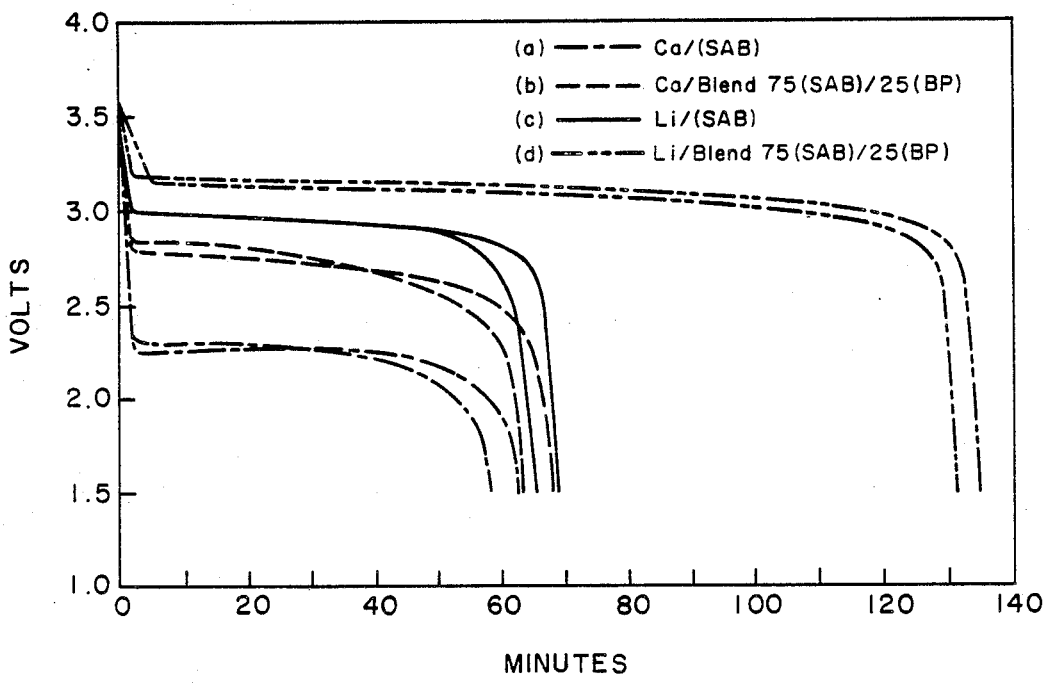
(a) Ca/(SAB)
(b) Ca/Blend 75(SAB)/25(BP)
(c) Li/(SAB)
(d) Li/Blend 75(SAB)/25(BP)
VOLTS
4.0
3.5
3.0
2.5
2.0
1.5
1.0
0
20
40
60
80
100
120
140
MINUTES

CATHODE FOR USE IN HIGH ENERGY PRIMARY THIONYL CHLORIDE CELL SYSTEMS AND HIGH ENERGY PRIMARY THIONYL CHLORIDE CELL SYSTEMS INCLUDING THE CATHODE

The invention described herein may be manufactured, used, and licensed by or for the Government for governmental purposes without the payment to us of any royalty thereon.

This invention relates to a cathode suitable for use in high energy primary thionyl chloride cell systems and to high energy primary thionyl chloride cell systems including the cathode.

BACKGROUND OF THE INVENTION

In the field of high energy primary cells, the thionyl chloride cell system appears very attractive for its high open circuit potentials, high theoretical energy density, broad operating temperature ranges and storeability. Both calcium and lithium cells have been studied. The main incentive for using calcium in place of the more popular lithium is that calcium anodes have higher melting temperatures than lithium anodes. The disparity between the melting points of these two metals is of special interest since 839° C. required to melt calcium would not likely be reached by any internally driven cell condition. This precludes the likelihood of difficulties traceable to a molten anode leading to thermal run aways often seen in lithium-thionyl chloride cells.

However, carbon cathode capacities tend to be lower for calcium based cells than for analogous lithium cells due to formation of a glassy calcium chloride deposit rather than the crystalline lithium chloride deposit normally formed in lithium based cells.

SUMMARY OF THE INVENTION

The general object of this invention is to provide an improved cathode for use in high energy primary thionyl chloride cell systems. A more particular object of the invention is to provide an improved cathode for use in lithium-thionyl chloride cells and in calcium-thionyl chloride cells.

It has now been found that the aforementioned objectives can be attained and overall cathode performance improved by using a mixture of a low surface area conductive carbon black and a high surface area coductive carbon black. This carbon black mixture when made into cathodes, gives better cathode performance in lithium thionyl chloride cells and calcium thionyl chloride cells than either of the two starting carbon blacks individually.

DESCRIPTION OF THE PREFERRED EMBODIMENT

Shawinigan Acetylene Black (SAB) having a surface area of 60 $m^2/gm$ is used as the low surface area conductive carbon black and Black Pearls 2000 (BP) having a surface area of 1475 $m^2/gm$ is used as the high surface area conductive carbon black.

The two carbon blacks are mixed in a 75% (SAB) 25% (BP) weight ratio with polytetrafluoroethylene emulsion binder in a 100:10 carbon black:binder weight ratio and pasted on an expanded nickel metal current collector screen and dried under vacuum between weights to make the final porous carbon cathodes. The cathode size in this instance is 0.25 $cm^2$ on each side for a 0.5 $cm^2$ total geometric area. However, the cathode may be made to any desired dimension.

Galvanostatic discharge performance is measured at 20 $mA/cm^2$ for the mixed carbon black cathode and compared in performance to a carbon black cathode made from (SAB), the most widely used low surface area conductive carbon black. The discharge rate of 20 $mA/cm^2$ corresponds if scaled up, to a 6.6 A discharge rate on a typical "D" sized cell.

(BP), a conductive high surface area carbon black, can by itself, not be easily fabricated into structually sound cathodes. Cathodes made from (BP) tend to have sloping discharge profiles. However, the blend of (SAB) and (BP) achieves the optimum conductive surface area and perhaps pore size distribution to allow optimum reduced cathode voltage polarization and a flat discharge profile.

DESCRIPTION OF THE DRAWING

The drawing shows discharge curves obtained by galvanostatic discharge measured at 20 $mA/cm^2$ for:

(a) a cathode made from (SAB) in a cell with a Ca anode and an electrolyte of 1 molar $Ca(AlCl_4)_2$ in thionyl chloride (b) a cathode made from 75(SAB)/25(BP) with a Ca anode and an electrolyte of 1 molar $Ca(AlCl_4)_2$ in thionyl chloride (c) a cathode made from (SAB) in a cell with a Li anode and an electrolyte of 1 molar $LiAlCl_4$ in thionyl chloride (d) a cathode made from 75(SAB)/25(BP) with a Li anode and an electrolyte of 1 molar $LiAlCl_4$ in thionyl chloride.

The improvement in cell performance obtained by using the blend of carbon blacks in the cathode in both the lithium-thionyl chloride and calcium-thionyl chloride systems is clearly seen from the drawing.

In lieu of (SAB) as the low surface area conductive carbon black, one can use any other carbon black having a surface area less than 100 $m^2/gm$.

The high surface area conductive carbon blacks that can be used are those having a surface area above 250 $m^2/gm$.

The two carbon blacks can be blended or mixed in the approximate ratio of 3 to 1 parts by weight of low surface area conductive carbon black to high surface area conductive carbon black.

The mixed or blended carbon blacks can be mixed with the polytetrafluoroethylene binder in the ratio of about 10 parts by weight mixed carbon black to about 1 part by weight of binder.

We wish it to be understood that we do not desire to be limited to the exact details as described for obvious modifications will occur to a person skilled in the art.

What is claimed is:

1. A cathode for use in a high energy primary thionyl chloride cell system said cathode comprising an expanded metallic current collector screen bearing a dried pasted mixture of a low surface area conductive carbon black and a high surface area conductive carbon black previously mixed with a binder wherein the low surface area conductive carbon black has a surface area of about 60 $m^2/gm$ and the high surface area conductive carbon black has a surface area of about 1475 $m^2/gm$, wherein the low surface area conductive carbon black is mixed with the high surface area conductive carbon black in the ratio of about 75 parts by weight low surface area black to about 25 parts by weight of high surface area black, wherein the binder is a polytetrafluoroethylene emulsion and wherein the mixture of carbon blacks is mixed with polytetrafluoroethylene emulsion in the ratio of about 100 parts by weight of carbon black mixture to about 10 parts by weight of polytetrafluoroethylene emulsion.

2. A cathode according to claim 1 for use in a high energy primary lithium thionyl chloride cell system.

3. A cathode according to claim 1 for use in a high energy primary calcium thionyl chloride cell system.

4. A high energy primary cell system comprising lithium as the anode, a solution of an inorganic lithium salt in thionyl chloride as the electrolyte, and an expanded metallic current collector screen bearing a dried pasted mixture of a low surface area conductive carbon black and a high surface area conductive carbon black previously mixed with a binder as the cathode wherein the low surface area conductive carbon black has a surface area of about 60 $m^2/gm$ and the high surface area conductive carbon black has a surface area of about 1475 $m^2/gm$, wherein the low surface area conductive carbon black is mixed with the high surface area conductive carbon black in the ratio of about 75 parts by weight low surface area conductive carbon black to about 25 parts by weight high surface area conductive carbon black, wherein the binder is a polytetrafluoroethylene emulsion, and wherein the mixture of carbon blacks is mixed with polytetrafluoroethylene in the ratio of about 100 parts by weight of carbon black mixture to about 10 parts by weight of polytetrafluoroethylene emulsion.

5. A high energy primary cell system comprising calcium as the anode, a solution of an inorganic calcium salt in thionyl chloride as the electrolyte, and an expanded metallic current collector screen bearing a dried pasted mixture of a low surface area conductive carbon black and a high surface area conductive carbon black previously mixed with a binder as the cathode wherein the low surface area conductive carbon black has a surface area of about 60 $m^2/gm$ and the high surface area conductive carbon black has a surface of about 1475 $m^2/gm$, wherein the low surface area conductive carbon black is mixed with the high surface area conductive carbon black in the ratio of about 75 parts by weight low surface area conductive carbon black to about 25 parts by weight high surface area conductive carbon black, wherein the binder is a polytetrafluoroethylene emulsion, and wherein the mixture of carbon blacks is mixed with polytetrafluoroethylene emulsion in the ratio of about 100 parts by weight of carbon black mixture to about 10 parts by weight of polytetrafluoroethylene emulsion.

* * * * *